United States Patent [19]

Albert

[11] 4,446,394

[45] May 1, 1984

[54] LINEARIZING MECHANISM FOR A VIBRATING BEAM FORCE TRANSDUCER

[75] Inventor: William C. Albert, Boonton, N.J.

[73] Assignee: The Singer Company, Little Falls, N.J.

[21] Appl. No.: 301,622

[22] Filed: Sep. 14, 1981

[51] Int. Cl.$^3$ ............................................. H01L 41/08
[52] U.S. Cl. .................................. 310/321; 310/323; 310/338; 310/25
[58] Field of Search ............... 310/321, 323, 330, 338, 310/348, 15, 25, 367, 368, 370; 73/777, 778, 781, DIG. 1, DIG. 4

[56] References Cited

U.S. PATENT DOCUMENTS

| | | | |
|---|---|---|---|
| 3,470,400 | 9/1969 | Weisbord | 310/323 X |
| 3,479,536 | 11/1969 | Norris | 310/323 |
| 3,513,356 | 5/1970 | Newell | 310/321 X |
| 4,215,570 | 8/1980 | Nisse | 310/338 X |
| 4,321,500 | 3/1982 | Paros et al. | 310/323 X |

Primary Examiner—Peter S. Wong
Attorney, Agent, or Firm—Morris Liss; T. W. Kennedy

[57] ABSTRACT

A single beam force transducer is provided with integrally affixed isolation springs which are axially compliant and unbalanced in their spring rates so as to induce beam bending due to applied tension and compression. The amount of bending introduced due to applied tension will be of a precise magnitude so as to substantially cancel undesirable non-linear vibration effects.

5 Claims, 12 Drawing Figures

RESONATOR UNLOADED

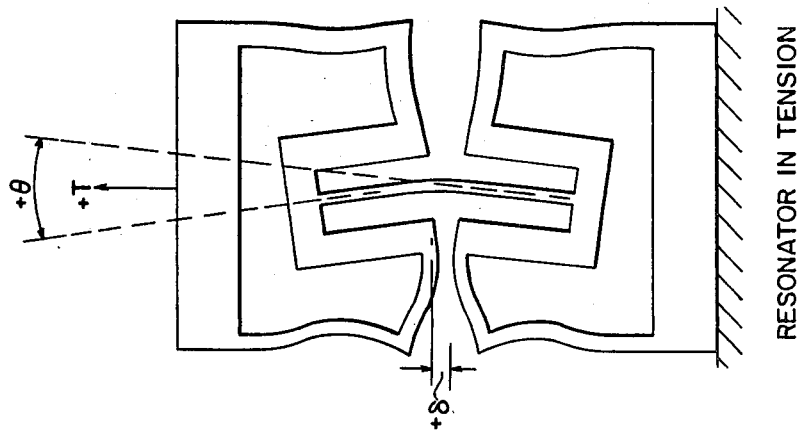
FIG. 4C  RESONATOR IN TENSION
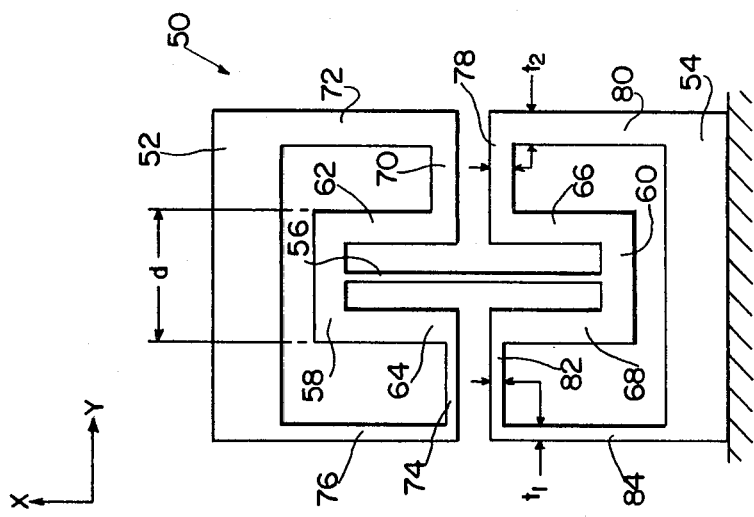
FIG. 4B  RESONATOR UNLOADED
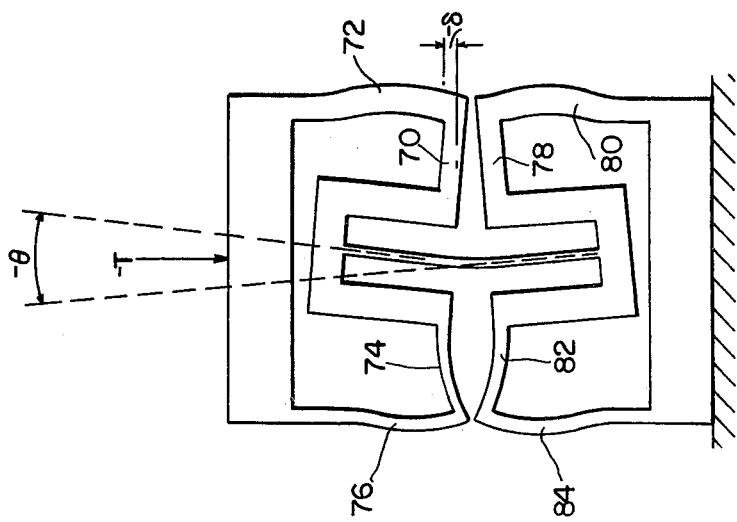
FIG. 4A  RESONATOR IN COMPRESSION

LINEARIZING MECHANISM FOR A VIBRATING BEAM FORCE TRANSDUCER

FIELD OF THE INVENTION

The present invention relates to vibrating beam accelerometers and more particularly to isolator means for isolating the vibrations of a vibratory beam from its mounts to minimize coupling between the member and its mounts over the range of operating vibration frequencies.

BRIEF DESCRIPTION OF THE PRIOR ART

In certain apparatus such as vibrating beam accelerometers, a vibratory member is supported in such a way that forces of acceleration or deceleration are applied at the ends of the apparatus to change its axial stresses. In an axially unstressed condition, a beam has a certain natural frequency of vibration, determined primarily by its dimensions, the material of which it is constituted, temperature, and the media in which it is operating. In response to an axial stress applied to the beam, the beam's natural frequency of vibration changes; the frequency increasing in response to axial tension and decreasing in response to axial compression.

It is, of course, desirable that the vibration frequency of the vibratory member be a true and accurate representation of the axial stress applied to it. However, in prior art apparatus of this type, this is not the case. A certain mounting problem exists in that it is difficult to mount the member without seriously degrading its performance. There is an energy loss at the mount due to the existence of a mounting interface that, in the case of a beam, must resist the forces and moments generated by the vibrating member and, in the case of a string, must resist the forces generated. This results in a decrease in the Q factor of the resonator, that is, the ratio of energy stored to energy lost. The frequency stability of the resonator is degraded by the decrease in Q. Moreover, instabilities of the mount result in further instabilities in the operation of the resonator.

U.S. Pat. No. 3,470,400 issued to Weisbord, assigned to the present assignee, discloses a transducer wherein the vibratory member's vibration and its changes in vibration are less influenced by its mounts so that changes in vibration would be more directly related to the actual stress applied to it. Although the transducer disclosed in the mentioned patent works generally satisfactorily, it has been found that the vibratory member's vibration is influenced by undesirable non-linear effects.

A further prior art approach attempted to correct this effect by using a two-resonator—two-proof mass arrangement, to be discussed hereinafter, which puts one beam in tension and the other in compression. The disadvantage to such an arrangement is the need for two mechanisms which results in increased cost and instrument size in many applications.

BRIEF DESCRIPTION OF THE PRESENT INVENTION

The present invention is an improvement of the transducer disclosed in the previously mentioned Weisbord patent. However, the present design includes a different configuration of the isolator springs. The isolator springs of the present design are more compliant in response to input tension and compression along the beam axis. It is an important feature of the invention that the stiffness of the isolator springs is greater on one side of the vibratory member than on the other. This leads to unbalanced spring rates so as to induce beam bending due to applied tension and compression. The amount of bending introduced due to applied tension will be of a precise magnitude so as to substantially cancel undesirable linear effects which are present in the transducer disclosed in the Weisbord patent. Accordingly, the present invention offers the advantage of eliminating the non-linear effects by utilizing a single vibratory member as opposed to the use of two vibratory members as is done by the second-mentioned prior art approach. For many applications, this will result in reduction of cost and size of the transducer with optimum performance characteristics.

The above-mentioned objects and advantages of the present invention will be more clearly understood when considered in conjunction with the accompanying drawings, in which:

BRIEF DESCRIPTION OF THE FIGURES

FIGS. 4A-4C are elevational views of the present invention respectively illustrated in compression, unloaded and in tension.

DETAILED DESCRIPTION OF THE INVENTION

Figure 1:
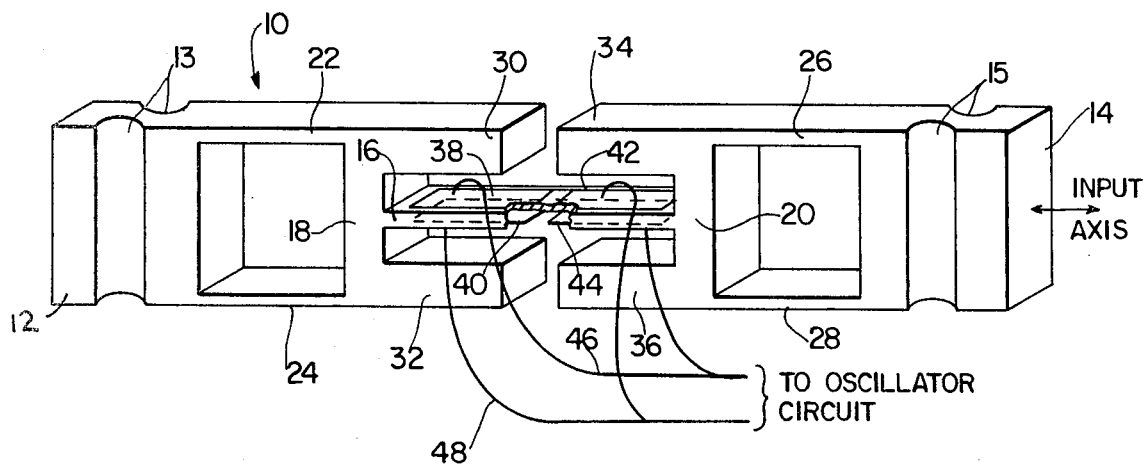
FIG. 1 is a perspective view of a vibratory beam apparatus with decoupling structure as disclosed in U.S. Pat. No. 3,470,400.

FIG. 1 of the drawings illustrates the transducer 10 disclosed in U.S. Pat. No. 3,470,400 which represents generally an entire vibratory beam apparatus including a pair of end mounts 12 and 14 which may be respectively recessed at 13 and 15 to form cross axis hinges and to which supporting members are attached and to which axial forces are applied along an input axis designated, when the unit is used as a force measuring unit as in an accelerometer. The transducer 10 includes a vibratory beam 16 extending between and secured to respective support members 18 and 20.

For decoupling or isolating the beam from mounts 12 and 14 at beam operating frequencies, support members 18 and 20 are connected to respective mounts 12 and 14 by pairs of spaced, thin spring members 22, 24 and 26, 28 and pairs of isolator masses 30, 32 and 34, 36 extending from respective support members 18 and 20 co-extensively with a portion of the beam 16. The particular lengths and other dimensions of the masses are correlated with the beam properties, however, in all events the masses 30 and 34 are axially spaced and masses 32 and 36 are similarly axially spaced. Axial stresses, either tension or compression, applied to the end mounts 12 and 14 are transmitted to the beam 16 through the thin spring members 22 and 24 and 26 and 28.

The beam transducer 10 may be formed from a single block of any suitable material. However, for the sake of clarity, it will be set forth as applied to an apparatus made of quartz or other piezoelectric material to form the particular configuration shown and described, material is cut away by any suitable well-known procedure.

For driving the beam 16 in the body shear mode, pairs of electrodes 38 and 40 are attached to opposite sides of the beam along one axial extent and another pair of electrodes 42 and 44 are attached to opposite sides of the beam along another axial extent. An electronic oscillator, not shown, may provide driving excitation for the beam and leads 46 and 48 from the oscillator are connected to the electrodes. Lead 46 is connected to electrodes 38 and 44, and lead 48 is connected to electrodes 40 and 42. Thus, the electrical excitation applies oppositely directed transverse electric fields through the beam at axially spaced locations. In a manner described in detail in U.S. Pat. No. 3,479,536 issued to Frank Norris and assigned to the present assignee, this described construction and electrical excitation is effective to produce vibration in the beam. It is to be understood, however, that the beam may be driven by other means, the particular one described being only representative and preferred for particular situations.

The purpose of this invention is to decrease the non-linearity effects of the frequency versus tension characteristics of the vibrating beam force transducer used in the vibrating beam accelerometer.

The frequency versus force characteristics of the transducer shown in FIG. 1 is described approximately by the equation:

$$f = f_0 + K_1 T + K_2 T^2 \qquad \text{Eq. (1)}$$

Figure 2A:
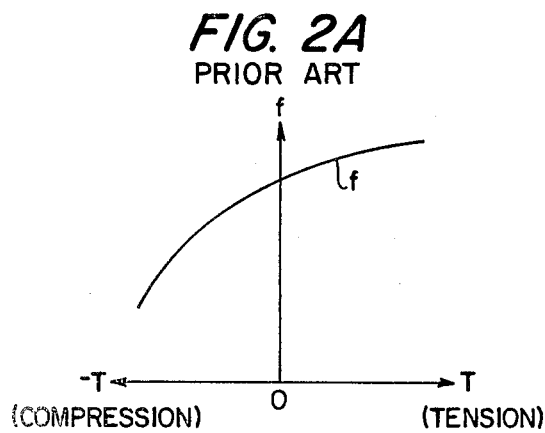
FIGS. 2A and 2B are frequency versus force characteristics of the apparatus shown in FIG. 1.
Figure 2B:
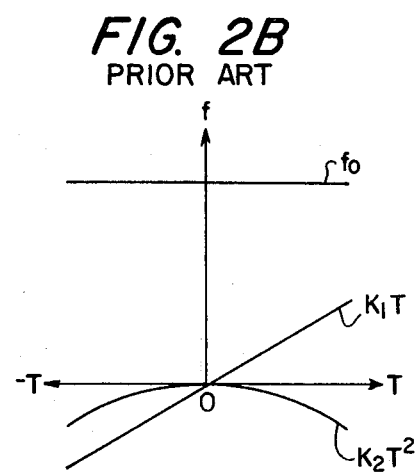
Figure 3:
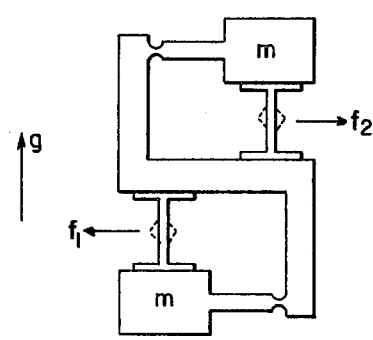
FIG. 3 is an elevational view of a prior art two-resonator—two-proof mass transducer.

Where
  f = vibrating beam resonant frequency
  $f_0$ = vibrating beam no load bias frequency
  $K_1$ = the first order frequency-tension sensitivity (scale factor)
  $K_2$ = the second order frequency-tension sensitivity (non-linear term)
  T = tension force The frequency versus force characteristics are illustrated in FIG. 2A, while each term of Equation 1 is plotted separately in FIG. 2B. The term containing the $K_2$ coefficient is an undesirable non-linear effect. This undesirable non-linearity may be minimized by using a prior art two-resonator—two-proof mass transducer which puts one beam in tension and the other in compression as mentioned in the Brief Description of the Prior Art and shown in FIG. 3. The output of the transducer is taken as the difference frequency of these two individual resonator frequencies. As Equations 2 through 4 indicate, the $K_2$ effects cancel using this design. Note that the tension force T is replaced by its equivalent mg. Also note that a second subscript is used to distinguish the individual resonator coefficients.

Resonator 1 will be in tension and therefore:

$$f_1 = f_{01} + k_{11} mg + K_{21}(mg)^2 \qquad \text{Eq. (2)}$$

Resonator 2 will be in compression and therefore:

$$f_2 = f_{02} + K_{12}(-mg) + K_{22}(mg)^2 \qquad \text{Eq. (3)}$$

The difference frequency will be $$f_1 - f_2 = (f_{01} - f_{02}) + (K_{11} + K_{12})mg + (K_{21} - K_{21})(mg)^2 \qquad \text{Eq. (4)}$$

The $K_2$ effects cancel due to the squaring of the $-mg$ term.

As previously mentioned a disadvantage of the latter design is the need for two separate proof mass and resonator assemblies. This results in increased cost and instrument size in many applications.

Referring to the construction of the present invention as shown in FIG. 4B, the central portion of the transducer resembles that of the prior art transducer disclosed in U.S. Pat. No. 3,470,400. As will be seen, the transducer of the present invention is generally indicated by reference numeral 50 which includes a pair of end mounts 52 and 54, one of which may be fixed to a stationary surface as shown. The end mounts form cross axis hinges to which supporting members are attached and to which axial forces are applied along an input axis designated, when the unit is used as a force measuring unit as in an accelerometer. The transducer 50 includes a vibratory beam 56 extending between and secured to respective support members 58 and 60.

Pairs of isolator masses 62, 64 and 66, 68 extend from respective support members 58 and 60 coextensively with a portion of the beam 56. The particular lengths and other dimensions of the masses are correlated with the beam properties. However, in all events, the masses 62 and 66 are axially spaced and masses 64 and 68 are similarly axially spaced. Axial stresses, either tension or compression, are applied to the end mounts 52 and 54 through spring members 70, 72, 74, 76 on the upper illustrated section of the transducer and 78, 80, 82 and 84 on the lower illustrated section of the transducer. The spring member 70 is coextensive with the mass 62 and parallel to the end mount 52. Similarly, spring member 74 is coextensive with mass 64 and parallel with end mount 52. It will be noticed that spring members 70 and 74 although symmetrically disposed relative to the beam 56, are of different thickness.

Spring member 72 is coextensively located between spring member 70 and end mount 52 and is parallel spaced with the mass 62. Similarly, spring member 76 is coextensively located between spring member 74 and end mount 52 and is parallel to the mass 64. Although spring members 72 and 76 are symmetrically positioned relative to the beam 56, they are not of the same thickness. A similar relationship exists between the spring members 78 and 82 as well as 80 and 84 on the lower section of the transducer.

The primary difference in the present invention when compared to that of the prior art transducer of FIG. 1 lies chiefly in the design and operation of the spring members. The spring members of the present invention are more compliant in response to input tension and compression along the beam axis when compared with that of the prior art. It is an important feature of the present invention that the stiffness of the spring members is greater on one side of the beam than the other. The reason for this design criteria will be made more apparent hereinafter.

Figure 5A:
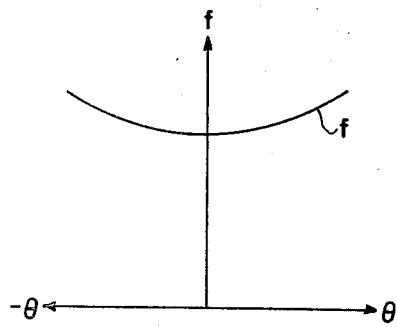
FIGS. 5A and 5B are plots of frequency versus bending angle characteristics of the present invention.
Figure 5B:
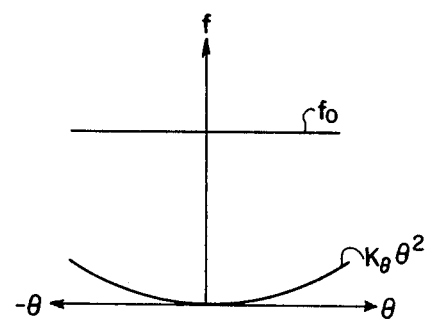

The mechanical deformation of the invention in response to tension and compression is illustrated in FIGS. 4A–4C. The isolator spring members 70–84 are designed to be compliant in the X direction and the thickness ($t_1$) of the isolator spring members (and therefore the stiffness) on one side (74, 76) (82, 84) is greater than the thickness $t_2$ on the other side (70, 72) (78, 80). The beam 56 will also bend in response to applied tension as illustrated in FIGS. 4A and 4C. It has been discovered by experiment that the frequency of the beam will vary as a function of the bending angle θ as illustrated in FIGS. 5A and 5B and described by Equation 5. Note that this bending-frequency sensitivity is in addition to the tension-frequency sensitivity previously described.

$$f = f_0 + K_\theta \theta^2 \qquad \text{Eq. (5)}$$

Where f and $f_0$ are the same parameters
$K_\theta$ = the frequency-angle sensitivity
$\theta$ = the beam bending angle Note that this f versus $\theta$ behavior is also a second order non-linear function as was the $K_2$ effect previously described. Note also that the frequency of the beam increases due to bending while the frequency of the beam decreases due to the $K_2$ effect. By proper design of the isolator springs, a condition will be arrived at for which the bending effect will cancel the $K_2$ effect. The necessary conditions for this to happen are determined in the following example:

Equation 6 is an expression which includes both the bending and tension effects on frequency.

$$f = f_0 + K_1 T + K_2 T^2 + K_\theta \theta^2 \qquad \text{Eq. (6)}$$

By design, the angle $\theta$ will be made to be a function of T as described by Equation 7.

$$\theta = (\Delta\theta/\Delta T)T \qquad \text{Eq. (7)}$$

Where $(\Delta\theta/\Delta T)$ is the bending angle versus tension sensitivity. When Equation 7 is substituted into Equation 6

$$f = f_0 + K_1 T + [K_2 + K_{74}(\Delta\theta/\Delta T)^2] T^2 \qquad \text{Eq. (8)}$$

It is the object of the invention to have the $T^2$ effects be nominally zero by designing the $[K_2 + K_\theta(\Delta\theta/\Delta T)^2]$ expression to equal zero. Since $K_2$ and $K_\theta$ are known coefficients, it remains to determine the $(\Delta\theta/\Delta T)$ coefficient as will now be explained.

Figure 6A:
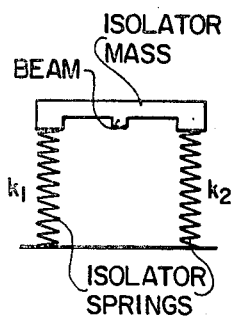
FIGS. 6A-6C are schematic illustrations of the isolator mass and the isolator springs of the present invention when unloaded and under load.
Figure 6B:
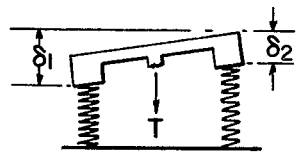
Figure 6C:
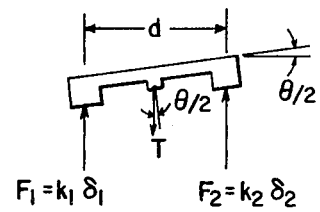

FIGS. 6A–6C are schematic representations of the isolator mass and the isolator springs. The load T is that transmitted by the beam and will be the same as the T loads shown in FIGS. 4A–4C. Because the isolator $k_1$ and $k_2$ spring rates are different, the isolator mass will tilt as shown. (It is assumed that because the vibrating beam is long and thin, it contributes negligible bending moment.)

From the summation of forces and moments of FIG. 6C, $$k_1 \sigma_1 + k_2 \sigma_2 = T \qquad \text{Eq. (9)}$$

and $$\frac{k_1 \sigma_1 d}{2} = \frac{k_2 \sigma_2 d}{2} \qquad \text{Eq. (10)}$$

From the geometry of FIG. 6C, $$\sigma_1 = \sigma_2 + \theta d/2 \qquad \text{Eq. (11)}$$

Now let $$k_2 = k_1 + \Delta k \qquad \text{Eq. (12)}$$

where $\Delta k$ is the differential stiffness between the two isolator springs.

Combining Equations 9 through 12 results in the following:

$$\theta = \frac{\Delta k T}{k_1(k_1 + \Delta k)d} \qquad \text{Eq. (13)}$$

If $\Delta k$ is small compared to k, Equation 13 can be approximated by Equation 14

$$\theta \approx \frac{\Delta k}{k^2 d} T \qquad \text{Eq. (14)}$$

Differentiating Equation 14 results in the sought-after expression $$\frac{\Delta \theta}{\Delta T} \approx \frac{\Delta k}{k_1^2 d} \approx \left(\frac{\Delta k}{k_1}\right) \frac{1}{k_1 d} \qquad \text{Eq. (15)}$$

Now the necessary $\Delta k/k$ ratio can be solved and the $K_2 + K_\theta (\Delta\theta/\Delta T)^2$ expression set equal to zero. Equation 15 is substituted into this expression.

$$K_2 + K_\theta(\Delta\theta/\Delta T)^2 = K_2 + K_\theta(\Delta k/k_1)^2 \frac{1}{k_1^2 d^2} = 0 \qquad \text{Eq. (16)}$$

Typical known values are:
$K_2 = -4.38(10^{-10})$ Hz/dyne$^2$
$K_\theta = 1.59(10^7)$ Hz/radian$^2$
$k_1 = 6.36(10^7)$ dyne/cm
$d = 0.40$ cm When these values are substituted into Equation 16 and $\Delta k/k_1$ is solved for:

$$\Delta k/k_1 = 0.13 \qquad \text{Eq. (17)}$$

which indicates that $k_2$ must be about 13 percent stiffer than $k_1$. For the bending beam-like isolator springs shown in FIGS. 4A–4C, for which stiffness is proportional to the thickness cubed ($t^3$), the 13 percent can be accomplished by having $t_2$ approximately 4 percent thicker than $t_1$. This is a practical condition to achieve.

In summary, the advantage of this invention is that the undesirable non-linear effects are cancelled with just one resonator rather than the use of two as in the prior art. For many applications, the invention will result in cost and size reductions.

The embodiment just disclosed achieves the spring rate unbalance by making one isolator spring thicker than the other. This unbalance can also be achieved by making one spring shorter than the other. A combination of thickness and length difference will also gain the desired advantage.

It should be understood that the invention is not limited to the exact details of construction shown and described herein for obvious modifications will occur to persons skilled in the art.

I claim:

1. A force transducer comprising a vibrating beam having a longitudinal axis and adapted to vibrate in a plane including the axis;

a supporting element secured to each end of the beam and extending in both directions tranversely of the axis;

a pair of end mounts;

axially complaint isolator spring means each having multiple sections of unbalanced spring rates and extending between each end mount and a corresponding support element for transmitting axial forces from the end mounts to the beam along the longitudinal axis thereof; and a pair of parallel spaced isolator means connected between each respective support element and sections of a corresponding spring means;

whereby the unbalanced spring rates of the spring means induce precise beam bending due to applied vibrational forces thereby substantially cancelling undesirable non-linear effects.

2. The structure set forth in claim 1 wherein each spring means comprises:

a first section parallel to the beam and extending from a first end portion of a respective end mount;

a second section perpendicular to the first and articulating from the first section to a corresponding isolator mass;

a third section parallel spaced to the first section and extending between a second end portion of a respective end mount, the third section having a thickness different from that of the first section; and a fourth section located in spaced co-linear relation to the second section and having a thickness different from that of the second section, the fourth section being perpendicular to the third section and articulating from the third section to a corresponding isolator means.

3. The structure set forth in claim 2 wherein the first and second sections have the same thickness.

4. The structure set forth in claim 2 wherein the third and fourth sections have the same thickness.

5. The structure set forth in claim 3 wherein the third and fourth sections have the same thickness.

* * * * *